United States Patent
Kobayashi et al.

(10) Patent No.: US 8,599,342 B2
(45) Date of Patent: Dec. 3, 2013

(54) METHOD OF MANUFACTURING A LIQUID CRYSTAL DISPLAY DEVICE COMPRISING A LIGHT-TRANSMITTING REINFORCING PLATE ARRANGED ON A FRONT SURFACE SIDE OF A LIQUID CRYSTAL DISPLAY PANEL WHEREIN A PHOTOCURING RESIN IS IRRADIATED FROM ONLY A SIDE SURFACE OF THE PHOTOCURING RESIN

(75) Inventors: Setsuo Kobayashi, Mobara (JP); Akira Ishii, Mobara (JP); Masanori Katsuyama, Iruma (JP); Shinji Tanabe, Mobara (JP); Kiyoshi Sento, Sakura (JP); Takeharu Furusawa, Mobara (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 24 days.

(21) Appl. No.: 13/029,207

(22) Filed: Feb. 17, 2011

(65) Prior Publication Data
US 2011/0205472 A1  Aug. 25, 2011

(30) Foreign Application Priority Data
Feb. 19, 2010 (JP) ................. 2010-034713

(51) Int. Cl.
*G02F 1/1333* (2006.01)
*G02F 1/13* (2006.01)

(52) U.S. Cl.
USPC ............ 349/122; 349/158; 349/162; 349/187

(58) Field of Classification Search
USPC ................ 349/14, 16, 60, 122, 158, 159, 162
See application file for complete search history.

(56) References Cited

U.S. PATENT DOCUMENTS

| | | | |
|---|---|---|---|
| 2007/0046874 A1* | 3/2007 | Adachi et al. | 349/122 |
| 2009/0066862 A1* | 3/2009 | Ishii et al. | 349/12 |
| 2009/0186552 A1* | 7/2009 | Shinya et al. | 445/58 |
| 2009/0190071 A1 | 7/2009 | Kubota et al. | |

FOREIGN PATENT DOCUMENTS

JP  2009-175531  8/2009

OTHER PUBLICATIONS

Office Action in corresponding Japanese Appln No. 2010-034713, dated Aug. 6, 2013.

* cited by examiner

*Primary Examiner* — Paul Lee
(74) *Attorney, Agent, or Firm* — Antonelli, Terry, Stout & Kraus, LLP.

(57) ABSTRACT

A liquid crystal display panel including liquid crystal sandwiched between a pair of substrates is prepared. A light-transmitting reinforcing plate is prepared. A photocuring resin is provided between the liquid crystal display panel and the reinforcing plate. Light is irradiated to a side surface of a laminated body constituted of the liquid crystal display panel, the reinforcing plate and the photocuring resin. The photocuring resin is arranged to face the liquid crystal in an opposed manner. The light is allowed to advance to the inside of the photocuring resin from an edge portion of the photocuring resin. The light is allowed to advance to the inside of the reinforcing plate from an edge portion of the reinforcing plate, is propagated in the inside of the reinforcing plate, and is irradiated to the photocuring resin from the reinforcing plate at a position away from the edge portion of the reinforcing plate.

10 Claims, 2 Drawing Sheets

METHOD OF MANUFACTURING A LIQUID CRYSTAL DISPLAY DEVICE COMPRISING A LIGHT-TRANSMITTING REINFORCING PLATE ARRANGED ON A FRONT SURFACE SIDE OF A LIQUID CRYSTAL DISPLAY PANEL WHEREIN A PHOTOCURING RESIN IS IRRADIATED FROM ONLY A SIDE SURFACE OF THE PHOTOCURING RESIN

CROSS-REFERENCE TO RELATED APPLICATION

The present application claims priority from Japanese application JP 2010-34713 filed on Feb. 19, 2010, the content of which is hereby incorporated by reference into this application.

BACKGROUND OF THE INVENTION

1. Field of the Invention

The present invention relates to a display device, a liquid crystal display device and a method of manufacturing these devices.

2. Description of the Related Art

There has been known a technique in which a reinforcing plate is adhered to a liquid crystal display panel for reinforcing the liquid crystal display panel (JP 2009-175531 A). The reinforcing plate and the liquid crystal display panel are adhered to each other using an ultraviolet curing resin. The reinforcing plate has a frame-shaped picture frame layer made of a light blocking material on a liquid crystal display panel side for an ornamental purpose or the like. A sealing material which seals liquid crystal is provided to the liquid crystal display panel in a frame shape, and the sealing material fixes a pair of substrates which sandwich the liquid crystal therebetween to each other. The picture frame layer is arranged to cover at least the sealing material and a portion of the liquid crystal adjacent to the sealing material.

To cure the resin for adhering the reinforcing plate to the liquid crystal display panel, ultraviolet rays are irradiated to the resin from a surface of the reinforcing plate. In this case, ultraviolet rays are blocked at the picture frame layer and hence, the curing degree of the resin below the picture frame layer is low. Accordingly, the resin exhibits the low curing degree at a portion thereof above the portion of the liquid crystal adjacent to the sealing material, and exhibits the high curing degree at a portion thereof above a portion of the liquid crystal slightly remote from the sealing material. Curing shrinkage is large at the portion of the resin where the curing degree is high. Since the curing shrinkage becomes large above the portion of the liquid crystal slightly remote from the sealing material, one of the substrates of the liquid crystal display panel is deformed whereby a gap between the substrates (a thickness of a liquid crystal layer) becomes large. There has been a drawback that an image is displayed more yellowing in a portion of the liquid crystal display panel having the enlarged gap than at other portions of the liquid crystal display panel due to a difference in optical transmissivity.

SUMMARY OF THE INVENTION

Accordingly, it is an object of the present invention to adhere a reinforcing plate to a display panel using a resin which is cured with light such as ultraviolet rays while preventing a gap between a pair of substrates of a liquid crystal display panel from becoming large.

(1) According to one aspect of the present invention, there is provided a method of manufacturing a liquid crystal display device which includes: a liquid crystal display panel in which a sealing material is arranged between a pair of substrates such that the sealing material surrounds liquid crystal; a light-transmitting reinforcing plate which is arranged on a front surface side of the liquid crystal display panel; and a photocuring resin which is provided between the liquid crystal display panel and the reinforcing plate, the method of manufacturing the liquid crystal display device including the step of: irradiating light to a side surface of a laminated body which is provided with the photocuring resin between the liquid crystal display panel and the reinforcing plate, wherein the photocuring resin is arranged to face the liquid crystal in an opposed manner, the light is allowed to advance to the inside of the photocuring resin from an edge portion of the photocuring resin, and the light is allowed to advance to the inside of the reinforcing plate from an edge portion of the reinforcing plate, is propagated in the inside of the reinforcing plate, and is irradiated to the photocuring resin from the reinforcing plate at a position away from the edge portion of the reinforcing plate.

In the present invention, the irradiation of light to the photocuring resin is performed from the edge portion of the photocuring resin. Accordingly, the curing degree of the photocuring resin becomes largest at the edge portion and is gradually lowered as a distance from the edge portion is increased. Further, the light is propagated in the inside of the light-transmitting reinforcing plate from the edge portion of the reinforcing plate so that the light is also irradiated at a position away from the edge portion of the photocuring resin and hence, the whole photocuring resin can be cured. Since the curing degree is gradually lowered as the distance from the edge portion is increased and hence, there is no possibility that portions which largely differ from each other in the curing degree are formed close to each other. Accordingly, even when the photocuring resin is shrunken by curing, a stress can be dispersed and hence, a deformation of the substrate of the liquid crystal display panel can be decreased thus preventing a gap between the substrates from becoming large.

(2) In the method of manufacturing a liquid crystal display device having the constitution (1), the reinforcing plate may be provided with a frame-shaped picture frame layer made of a light blocking material on at least one surface of the reinforcing plate, the reinforcing plate may be arranged such that at least an inner edge portion of the frame-shaped picture frame layer faces the liquid crystal in an opposed manner, and the photocuring resin is arranged to face at least the inner edge portion of the frame-shaped picture frame layer in an opposed manner.

(3) In the method of manufacturing a liquid crystal display device having the constitution (2), the reinforcing plate may be arranged such that the picture frame layer faces the sealing material and a portion of the sealing material arranged adjacent to the liquid crystal in an opposed manner.

(4) In the method of manufacturing a liquid crystal display device having the constitution (2) or (3), the photocuring resin may be arranged so as to avoid the photocuring resin facing the sealing material in an opposed manner.

(5) In the method of manufacturing a liquid crystal display device having the constitution (2) or (3), the photocuring resin may be arranged such that the photocuring resin faces the sealing material in an opposed manner, and reaches the outside over the sealing material.

(6) In the method of manufacturing a liquid crystal display device having any one of the constitutions (1) to (5), at least one of the liquid crystal display panel and the reinforcing plate may be prepared in a curved state, and the photocuring resin may be provided between the liquid crystal display panel and the reinforcing plate such that a thickness of the photocuring resin becomes largest at the edge portion of the photocuring resin and is gradually decreased as the distance from the edge portion is increased.

(7) In the method of manufacturing a liquid crystal display device having any one of the constitutions (1) to (6), the light may be irradiated from two directions which are opposite to each other.

(8) According to another aspect of the present invention, there is provided a method of manufacturing a display device which includes: a display panel which has an image display area; a light-transmitting reinforcing plate which is arranged on a front surface side of the display panel; and a photocuring resin which is provided between the display panel and the reinforcing plate, the method of manufacturing the display device including the steps of: arranging the photocuring resin between the display panel and the reinforcing plate such that the photocuring resin covers the image display area of the display panel; and curing the photocuring resin by irradiating light to only a side surface of a laminated body which is provided with the photocuring resin between the display panel and the reinforcing plate.

(9) In the method of manufacturing a liquid crystal display device having the constitution (8), the display device may have a rectangular shape, and the light is irradiated from a long side of the display device.

(10) According to still another aspect of the present invention, there is provided a display device including: a display panel which has an image display area; a light-transmitting reinforcing plate which is arranged on a front surface side of the display panel; and a photocuring resin which is provided between the display panel and the reinforcing plate, wherein the photocuring resin is arranged such that the photocuring resin covers the image display area of the display panel, and the photocuring resin is cured more at a peripheral portion of the image display area than at a center portion of the image display area.

(11) In the display device having the constitution (10), the display panel may be a liquid crystal display panel in which a sealing material is arranged between a pair of substrates such that the sealing material surrounds liquid crystal, and an edge portion of the photocuring resin may be positioned inside the sealing material.

(12) In the display device having the constitution (11), the reinforcing plate may have a light-blocking picture frame which is arranged such that the picture frame surrounds the image display area of the display panel, and the edge portion of the photocuring resin may be positioned outside an inner edge portion of the picture frame.

DETAILED DESCRIPTION OF THE INVENTION

Figure 1:
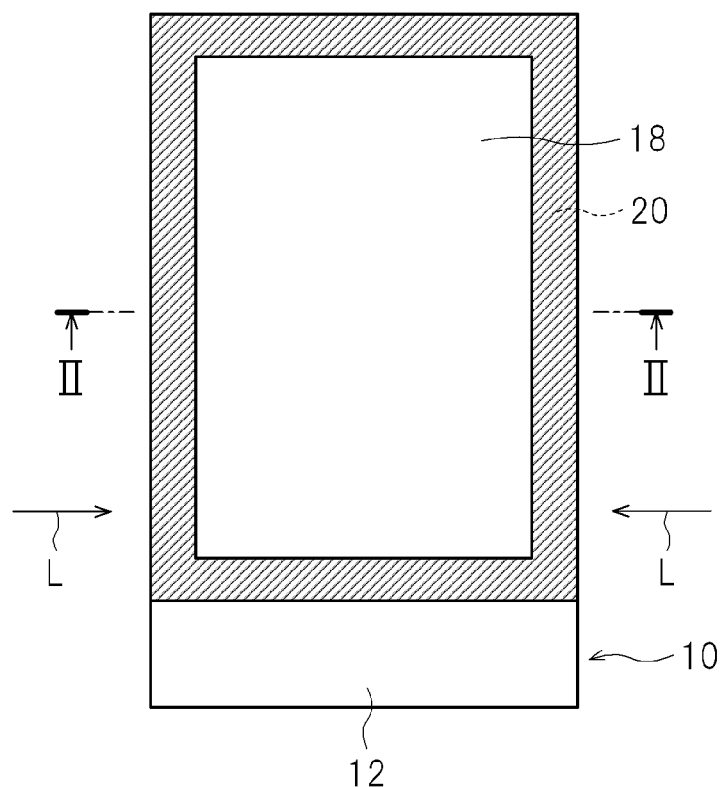
FIG. 1 is a plan view for explaining a method of manufacturing a liquid crystal display device according to an embodiment of the present invention.
Figure 2:
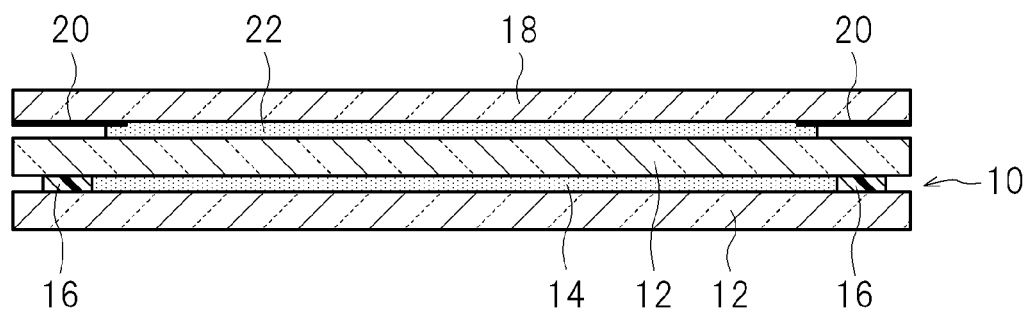
FIG. 2 is an enlarged cross-sectional view of the liquid crystal display device shown in FIG. 1 taken along a line II-II.

An embodiment of the present invention is explained in conjunction with drawings hereinafter. FIG. 1 is a plan view for explaining a method of manufacturing a liquid crystal display device according to the embodiment of the present invention. FIG. 2 is an enlarged cross-sectional view of the liquid crystal display device shown in FIG. 1 taken along a line II-II.

In this embodiment, a liquid crystal display panel 10 is prepared. The liquid crystal display panel 10 includes a pair of substrates 12 and liquid crystal 14 sandwiched between the pair of substrates 12. Although not shown in the drawing, the substrates 12 include a base member made of glass or the like and a polarizer which is adhered to the base member using an adhesive material on a side opposite to the liquid crystal 14. Further, a sealing material 16 is arranged between the pair of substrates 12 such that the sealing material 16 surrounds the liquid crystal 14. With the use of the sealing material 16, the liquid crystal 14 is sealed and the pair of substrates 12 are fixed to each other. To be more specific, the sealing material 16 is fixedly adhered to opposedly-facing surfaces of the pair of substrates 12 so that a distance between the pair of substrates 12 is hardly changed.

A drive method of the liquid crystal display panel 10 may be any method such as an IPS (In Plane Switching) method, a TN (Twisted Nematic) method or a VA (Vertical Alignment) method, and electrodes and lines corresponding to the method are formed on the liquid crystal display panel 10.

In this embodiment, a reinforcing plate 18 is prepared. The reinforcing plate 18 is made of a light-transmitting material such as glass. The reinforcing plate 18 has light-transmitting property and, particularly, the reinforcing plate 18 is preferably transparent. The reinforcing plate 18 has a strength which makes the reinforcing plate 18 more difficult to bend than the liquid crystal display panel 10. The reinforcing plate 18 has a frame-shaped picture frame layer 20 at least on one surface of the reinforcing plate 18. The picture frame layer 20 is made of a light blocking material and can be formed by printing. An outer periphery of the picture frame layer 20 is aligned with an outer periphery of the reinforcing plate 18. An opening formed inside the picture frame layer 20 is positioned above a display area of the liquid crystal display panel 10.

In this embodiment, a photocuring resin 22 is provided between the liquid crystal display panel 10 and the reinforcing plate 18. The reinforcing plate 18 is arranged such that at least an inner edge portion of the frame-shaped picture frame layer 20 faces the liquid crystal 14 in an opposed manner. The reinforcing plate 18 is arranged such that the picture frame layer 20 faces the sealing material 16 in an opposed manner. The reinforcing plate 18 is arranged such that the picture frame layer 20 faces an inner peripheral portion (a portion adjacent to the liquid crystal 14) of the sealing material 16 in an opposed manner. The reinforcing plate 18 is arranged such that the picture frame layer 20 faces an outer peripheral portion (a portion on a side opposite to the portion adjacent to the liquid crystal 14) of the sealing material 16 in an opposed manner.

The photocuring resin 22 is, for example, an ultraviolet curing resin. The photocuring resin 22 is arranged such that the photocuring resin 22 faces the liquid crystal 14 in an opposed manner. The photocuring resin 22 is arranged so as to avoid the photocuring resin 22 facing an edge portion (a portion adjacent to the sealing material 16) of a layer constituted of the liquid crystal 14 in an opposed manner. The photocuring resin 22 is arranged such that the photocuring resin 22 faces at least the inner edge portion of the frame-shaped picture frame layer 20 in an opposed manner. The photocuring resin 22 is arranged so as to avoid the photocuring resin 22 facing the sealing material 16 in an opposed manner. In this embodiment, the photocuring resin 22 does not face the sealing material 16 in an opposed manner at all.

Next, irradiation of light (ultraviolet rays, for example) is performed. To be more specific, light L is irradiated to a side surface of a laminated body which is constituted of the liquid crystal display panel 10, the reinforcing plate 18 and the photocuring resin 22. The light L is irradiated from two directions which are opposite to each other. When a planar shape of the liquid crystal display panel 10 is rectangular as shown in FIG. 1, the light L is irradiated to longitudinal sides of the liquid crystal display panel 10. Alternatively, the light L may be irradiated from four directions including two directions which are orthogonal to the above-mentioned two directions which are opposite to each other.

The light L is irradiated while avoiding the incidence of the light L on an outer surface (surface opposite to the photocuring resin 22) of the reinforcing plate 18. For this end, a light source not shown in the drawing is arranged such that an advancing direction of the light L does not intersect with the outer surface of the reinforcing plate 18.

The light source may be arranged along the whole long side of the rectangular laminated body. Further, the light source may be formed of a small light source such as a point light source, and the light L may be irradiated to the laminated body while moving the light source in an extending direction of a long side of the laminated body.

The display device shown in FIG. 2 includes the liquid crystal display panel 10 which has an image display area, the light-transmitting reinforcing plate 18 which is arranged on a front surface side of the liquid crystal display panel 10, and the photocuring resin 22 which is arranged between the liquid crystal display panel 10 and the reinforcing plate 18. The liquid crystal display panel 10 in which the sealing material 16 is arranged between the pair of substrates 12 such that the sealing material 16 surrounds the liquid crystal 14 is one example of a display panel. The reinforcing plate 18 has the light-blocking picture frame layer 20. As shown in FIG. 1, the picture frame layer 20 is arranged such that the picture frame layer 20 surrounds the display area of the display panel. A portion of the picture frame layer 20 faces the liquid crystal 14 in an opposed manner, and an inner edge of the picture frame layer 20 is positioned inside an outer edge of the liquid crystal 14.

The photocuring resin 22 is arranged such that the photocuring resin 22 covers the image display area of the liquid crystal display panel 10. The photocuring resin 22 of the display device is cured more at a peripheral portion of the image display area than at a center portion of the image display area.

The photocuring resin 22 completely covers the image display area of the liquid crystal display panel 10, and an edge portion of the photocuring resin 22 is positioned outside the inner edge portion of the picture frame. By covering the image display area with the photocuring resin 22 whose refractive index is adjusted, the reflection of undesired light at respective laminated layers can be suppressed and hence, a viewer can favorably recognize an image. Further, the edge portion of the photocuring resin 22 is posited inside the sealing material 16. Due to such a constitution, the display device can be manufactured while preventing the photocuring resin 22 from projecting to the outside of the display device so that the manufacturing time can be shortened.

Figure 3:
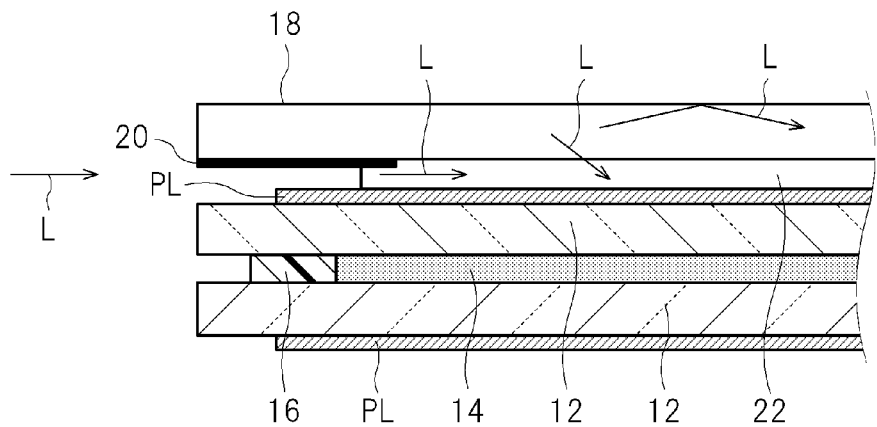
FIG. 3 is a view for explaining a step of irradiating light.

FIG. 3 is a view for explaining a step of irradiating the light L. The light L is allowed to advance to the inside of the photocuring resin 22 from the edge portion of the photo curing resin 22. In this embodiment, the incidence of the light L from a surface (front surface) of the reinforcing plate 18 on a side opposite to the photocuring resin 22 is avoided. Accordingly, a curing degree of the photocuring resin 22 becomes maximum at the edge portion of the photocuring resin 22 and is gradually lowered as a distance from the edge portion is increased.

The light L advances to the inside of the reinforcing plate 18 also from an edge portion of the reinforcing plate 18. In the inside of the reinforcing plate 18, the light L which is totally reflected propagates. The light L which propagates in the inside of the reinforcing plate 18 is irradiated to the outside from the reinforcing plate 18 while repeating the reflection thereof. Then, at a position away from the edge portion of the reinforcing plate 18, the light L is irradiated to the photocuring resin 22 from the reinforcing plate 18. According to this embodiment, the whole photocuring resin 22 can be cured. Further, the liquid crystal display panel 10 includes a polarizer PL on an outer side of the substrates 12 by which the liquid crystal 14 is sealed. During the propagation of the light L in the substrates 12, a quantity of the light L is reduced by the polarizer PL and, thereafter, the light L arrives at the photocuring resin. Accordingly, the light L which propagates in the substrates 12 exhibits extremely low ability of curing the photocuring resin 22. When an ultraviolet curing resin is used as the photocuring resin 22, the ultraviolet rays deteriorate the liquid crystal 14 and hence, the irradiation of the ultraviolet rays to the substrates 12 is not desirable.

According to this embodiment, the curing degree of the photocuring resin 22 is gradually lowered as the distance from the edge portion is increased and hence, there is no possibility that portions of the photocuring resin 22 which largely differ from each other in the curing degree are formed close to each other. Accordingly, even when the photocuring resin 22 is shrunken by curing, a stress can be dispersed and hence, a deformation of the substrates 12 of the liquid crystal display panel 10 can be decreased thus preventing a gap (a distance between the pair of substrates 12 or a thickness of a layer formed of the liquid crystal 14) from becoming large.

Although the liquid crystal display panel 10 and the reinforcing plate 18 are laminated to each other in the display device of this embodiment, the liquid crystal display panel 10 may include a touch panel.

Modification 1

Figure 4:
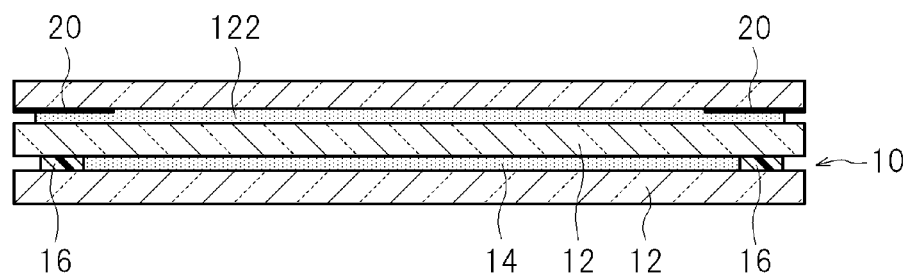
FIG. 4 is a view for explaining a modification 1 of the embodiment of the present invention.

FIG. 4 is a view for explaining a modification 1 of the embodiment of the present invention. In this modification, a photocuring resin 122 is arranged to face the sealing material 16 in an opposed manner. In the modification shown in FIG. 4, the photocuring resin 122 reaches the outside over the sealing material 16. However, an edge of the photocuring resin 122 may be arranged above the sealing material 16. Also in this modification 1, the curing degree of the photocuring resin 122 is gradually lowered as a distance from an edge portion of the photocuring resin 122 is increased and hence, there is no possibility that portions of the photocuring resin 122 which largely differ from each other in the curing degree are formed close to each other. Contents of the modification 1 other than the above-mentioned content are substantially equal to the corresponding contents explained in conjunction with the above-mentioned embodiment.

Modification 2

Figure 5:
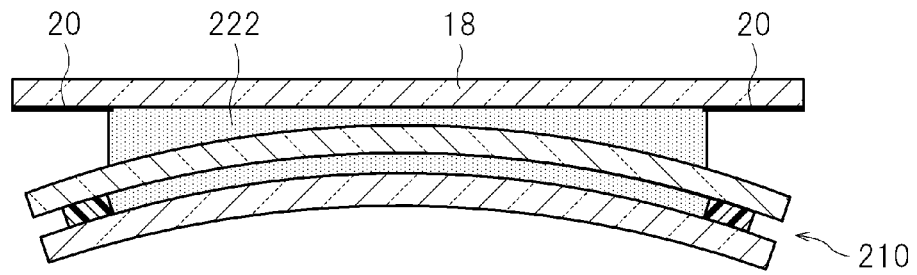
FIG. 5 is a view for explaining a modification 2 of the embodiment of the present invention.

FIG. 5 is a view for explaining a modification 2 of this embodiment of the present invention. In this modification, a photocuring resin 222 is provided between a liquid crystal display panel 210 and the reinforcing plate 18 such that a thickness of the photocuring resin 222 becomes largest at an edge portion of the photocuring resin 222 and is gradually decreased as a distance from the edge portion is increased.

For example, as shown in FIG. 5, the liquid crystal display panel 210 is prepared in a curved state, and the reinforcing plate 18 is arranged on a convex surface side of the curved liquid crystal display panel 210. As an opposite case, although not shown in the drawing, a reinforcing plate may be prepared in a curved state, and a liquid crystal display panel may be arranged on a convex surface side of the curved reinforcing plate. Further, although not shown in the drawing, both a reinforcing plate and a liquid crystal display panel may be prepared in a curved state, and the curved reinforcing plate and the curved liquid crystal display panel may be arranged such that a convex surface side of the reinforcing plate and a convex surface side of the liquid crystal display panel face each other in an opposed manner.

In this modification, while the thickness of the photocuring resin 222 becomes largest at the edge portion of the photocuring resin 222, a curing shrinkage amount of the photocuring resin 222 becomes largest at the edge portion, the curing degree of the photocuring resin 222 is gradually lowered as the distance from the edge portion of the photocuring resin is increased and hence, there is no possibility that portions of the photocuring resin 222 which largely differ from each other in the curing degree are formed close to each other. Contents of the modification 2 other than the above-mentioned content are substantially equal to the corresponding contents explained in conjunction with the above-mentioned embodiment.

The present invention is not limited to the above-mentioned embodiments, and various modifications are conceivable. For example, the constitution explained in conjunction with the embodiments can be replaced by the substantially same constitution, the constitution which can acquire the substantially same manner of operation and advantageous effects, or the constitution which can achieve the same object.

What is claimed is:

1. A method of manufacturing a liquid crystal display device which comprises: a liquid crystal display panel in which a sealing material is arranged between a pair of substrates such that the sealing material surrounds liquid crystal; a light-transmitting reinforcing plate which is arranged on a front surface side of the liquid crystal display panel; and a photocuring resin which is provided between the liquid crystal display panel and the light-transmitting reinforcing plate, the method of manufacturing the liquid crystal display device comprising:

irradiating light from outside of the liquid crystal display device to a side surface of a laminated body which is provided with the photocuring resin between the liquid crystal display panel and the light-transmitting reinforcing plate while avoiding the irradiating light from outside of the liquid crystal display device being incident onto a front surface side of the light-transmitting reinforcing plate, wherein the photocuring resin is arranged to face the liquid crystal in an opposed manner, enabling the irradiating light to advance to the inside of the photocuring resin from the side surface of the photocuring resin, and enabling the irradiating light to advance to the inside of the light-transmitting reinforcing plate from the side surface of the light-transmitting reinforcing plate, to be propagated in the inside of the light-transmitting reinforcing plate, and to be irradiated to the photocuring resin from within the light-transmitting reinforcing plate at a position away from the side surface of the light-transmitting reinforcing plate.

2. The method of manufacturing a liquid crystal display device according to claim 1, wherein the light-transmitting reinforcing plate is provided with a frame-shaped picture frame layer made of a light blocking material on at least one surface of the light-transmitting reinforcing plate, the light-transmitting reinforcing plate is arranged such that at least an inner surface portion of the frame-shaped picture frame layer faces the liquid crystal in an opposed manner, and the photocuring resin is arranged to face at least the inner surface portion of the frame-shaped picture frame layer in an opposed manner.

3. The method of manufacturing a liquid crystal display device according to claim 2, wherein the light-transmitting reinforcing plate is arranged such that the picture frame layer faces the sealing material and a portion of the sealing material arranged adjacent to the liquid crystal.

4. The method of manufacturing a liquid crystal display device according to claim 2, wherein the photocuring resin is arranged so as to avoid the photocuring resin facing the sealing material in an opposed manner.

5. The method of manufacturing a liquid crystal display device according to claim 3, wherein the photocuring resin is arranged so as to avoid the photocuring resin facing the sealing material in an opposed manner.

6. The method of manufacturing a liquid crystal display device according to claim 2, wherein the photocuring resin is arranged such that the photocuring resin faces the sealing material in an opposed manner, and reaches the outside over the sealing material.

7. The method of manufacturing a liquid crystal display device according to claim 3, wherein the photocuring resin is arranged such that the photocuring resin faces the sealing material in an opposed manner, and reaches the outside over the sealing material.

8. The method of manufacturing a liquid crystal display device according to claim 1, wherein at least one of the liquid crystal display panel and the light-transmitting reinforcing plate is prepared in a curved state, and the photocuring resin is provided between the liquid crystal display panel and the light-transmitting reinforcing plate such that a thickness of the photocuring resin becomes largest at the side portion of the photocuring resin and is gradually decreased as a distance from the side portion is increased.

9. The method of manufacturing a liquid crystal display device according to claim 1, wherein the light is irradiated from two directions which are opposite to each other to opposite side surfaces of the laminated body.

10. The method of manufacturing a liquid crystal display device according to claim 1, wherein the irradiating light is irradiated from outside of the liquid crystal display device only to the side surface of the laminated body.

* * * * *